Oct. 24, 1950 — G. A. REHM — 2,527,450
STEAM PURIFIER
Filed June 1, 1948 — 2 Sheets-Sheet 1

Inventor
Gustav A. Rehm
by Parker & Carter
Attorneys

Oct. 24, 1950

G. A. REHM 2,527,450

STEAM PURIFIER

Filed June 1, 1948

Inventor
Gustav A. Rehm
by Parker & Carter
Attorneys

Patented Oct. 24, 1950

2,527,450

UNITED STATES PATENT OFFICE 2,527,450

STEAM PURIFIER

Gustav A. Rehm, Springfield, Ill., assignor to Springfield Boiler Company, Springfield, Ill., a corporation of Illinois Application June 1, 1948, Serial No. 30,371

2 Claims. (Cl. 261—112)

My invention relates to an improvement in steam purifiers and has for one purpose to provide means for purifying the steam as it flows through the steam drum of a boiler.

One purpose is to provide improved means for collecting impurities and condensed moisture from steam.

Another purpose is to provide an improved assembly in which such a purifier is used.

Other purposes will appear from time to time in the course of the specification and claims.

I illustrate my invention more or less diagrammatically in the accompanying drawing, wherein.

Like parts are indicated by like symbols throughout the specification and drawings.

Figure 1:
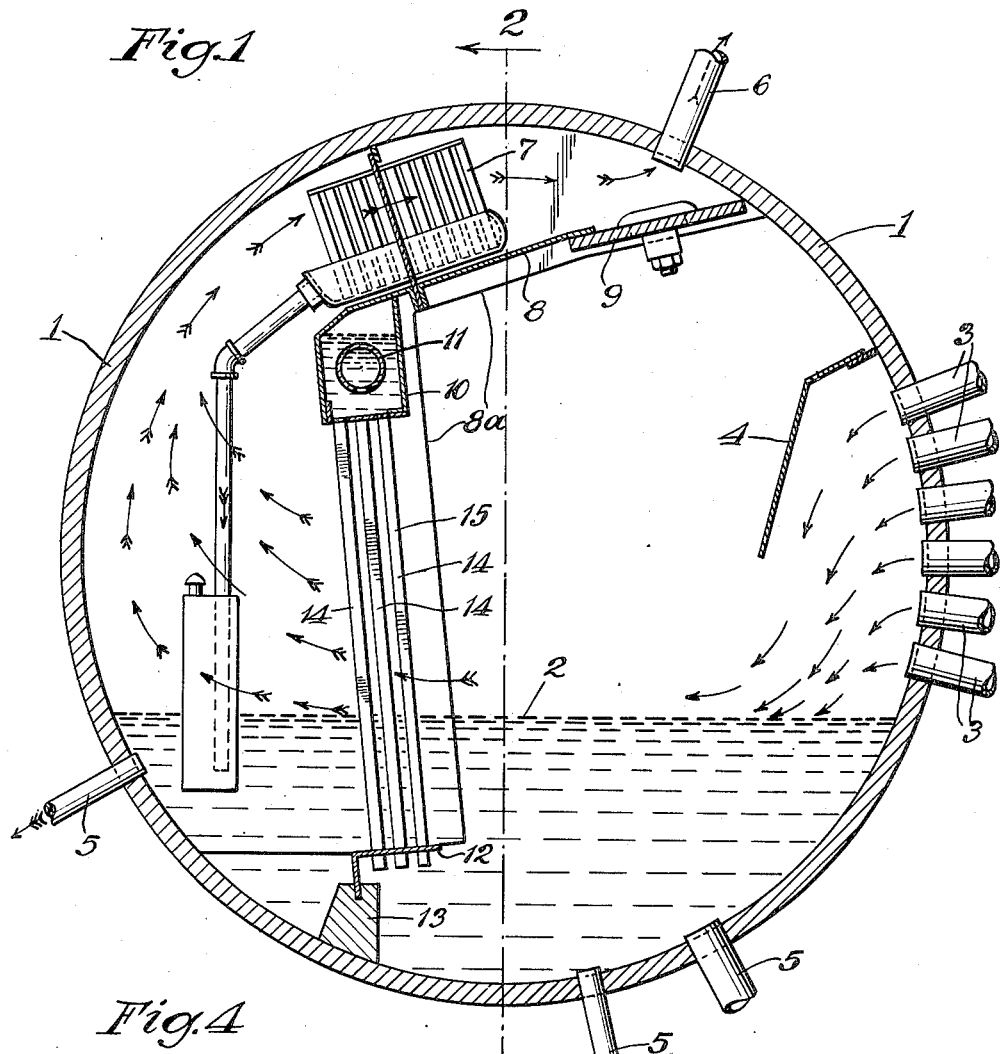
Figure 1 is a vertical transverse section through a steam drum to which my invention has been applied.

Referring to the drawings, 1 generally indicates the wall of a steam drum partially filled with a body of water 2. Steam delivery tubes or ducts 3 extend to the drum 1 and deliver steam to its interior, above the water level. If desired, a baffle 4 may be employed to divert the steam downwardly toward the surface of the water. 5 illustrates any suitable water tubes or ducts. 6 illustrates a duct or ducts extending from the drum 1. It may, for example, extend to a superheater. 7 is a dryer, the details of which do not, of themselves, form part of the present invention. It may be supported on or associated with a partition or baffle 8, one end of which connects with the hand-hole plate 9. The other edge of the baffle 8 has associated with it a water supply tank 10, and may receive water along any suitable water supply and distributing duct 11.

Figure 4:
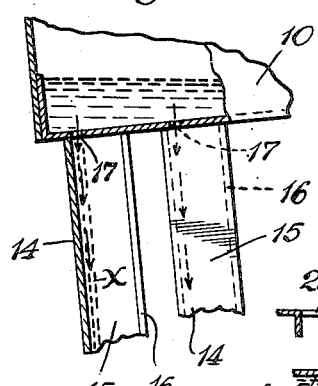
Figure 4 is a section on an enlarged scale along the line 4—4 of Figure 2.
Figure 2:
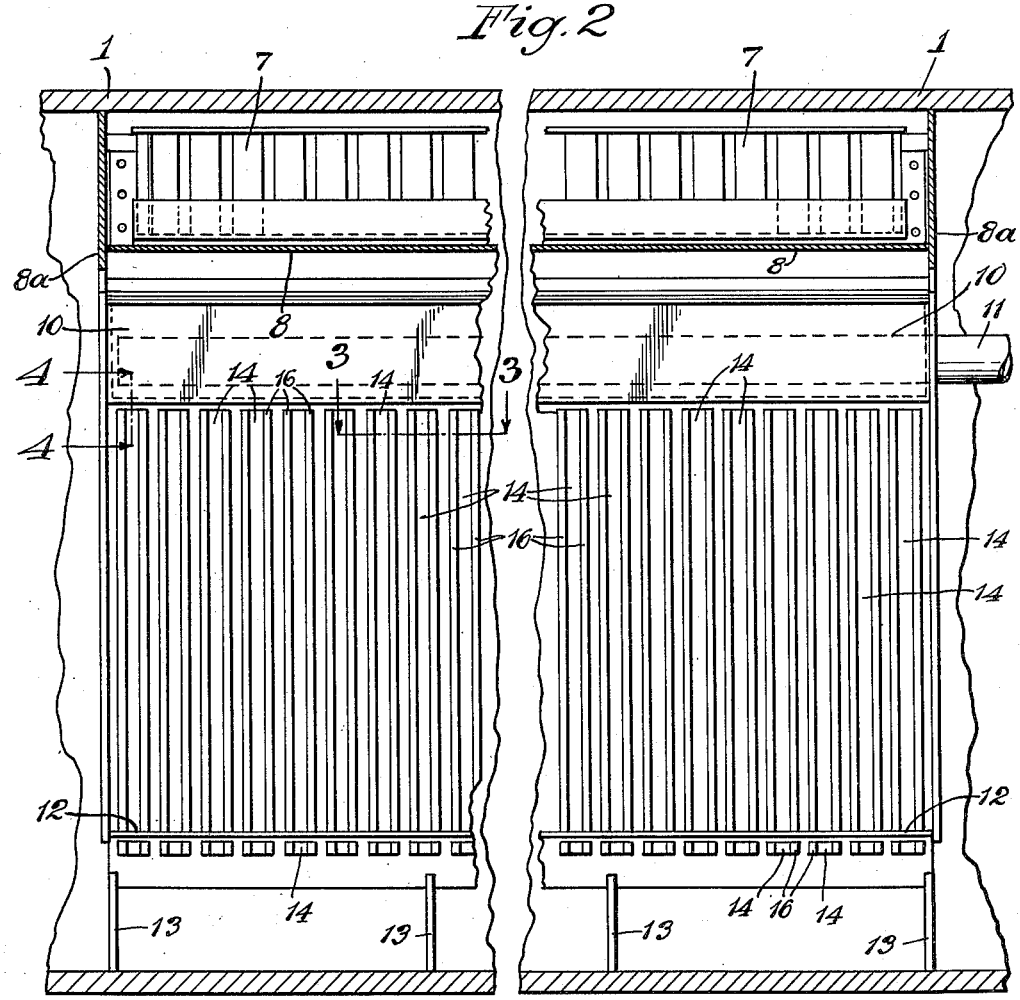
Figure 2 is a section along the line 2—2 of Figure 1.
Figure 3:
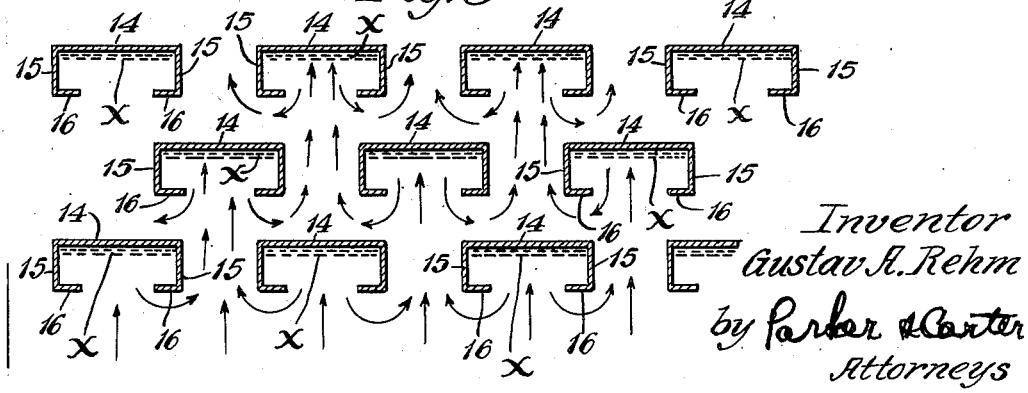
Figure 3 is a section on an enlarged scale on the line 3—3 of Figure 2.

12 is a bottom structural element supported in or on any suitable member or inward projection 13. It will be noted, as in Figure 2, that the tank 10 and the bottom support 12 are connected by a plurality of troughs 14 shown in cross-section in Figure 3. Each trough 14 is shown as having sides 15 and inwardly extending front flanges 16. If desired, the flanges 16 may be omitted. Each of the troughs 14 is in communication through a suitable aperture 17, with water in the supply tank 10. The water flows through the holes or slots 17 and flows down that face of each trough 14 which faces the flow of steam. Since the troughs are slightly inclined, the water will flow downwardly across and be backed by the trough back. This support or backing of the water is indicated in Figures 3 and 4, the water being shown as at x.

The steam delivered by the ducts 3 flows against or impinges against the battery or group of troughs 14. I find it advantageous to arrange them in the staggered relationship as shown in Figure 3.

The steam successively impinges against the water surface of the flow in the individual troughs. It escapes finally in the direction of the arrows of Figure 3 and flows upwardly to the dryer 7 and thence to the outlet tube or tubes 6.

Figure 6:
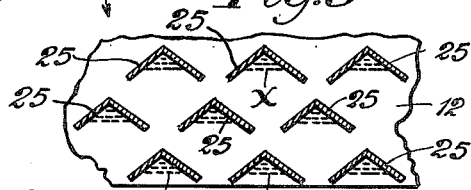
Figure 6 is a section similar to Figure 3, illustrating another form of invention.
Figure 5:
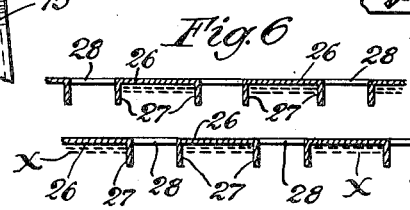
Figure 5 is a section similar to Figure 3, illustrating a variant form.

In Figure 5 I illustrate a variant form of trough in which troughs 25 are shown which are V-shaped in cross-section. In Figure 6 I illustrate a form in which, instead of having separate troughs, I employ a unitary panel which may be joined at top and bottom, but which has slots through it. This panel includes back members 26 and forwardly extending flanges 27, the individual back members being separated by spaces 28. Preferably, two or more of such panels are employed with their spaces staggered.

It will be realized that whereas I have described and shown a practical and operative device, nevertheless many changes may be made in size, shape, number and disposition of parts without departing from the spirit of my invention. I wish, therefore, that my showing be taken as in a broad sense diagrammatic and illustrative, rather than limiting me to the precise showing herein. For example, while I have illustrated a practical arrangement, in several different forms, of a structure which defines or provides a flow of water against which the steam impinges, it will be understood that any suitable means may be employed for defining a preferably backed flow of water against which the steam may impinge.

The use and operation of my invention are as follows:

It will be understood that the drum 1 is normally partially filled with water. My water carrying device extends from below water level upwardly, but stops short of the top of the drum. The space above the water supply tank 10 is closed by the members 8 and 9 and side plates 8a. However, any suitable means can be employed for assuring that the stream will pass through the above described purifier structure.

The purpose of my invention is to provide a flow of water against which the steam can directly impinge. Upon impinging against the water, it releases or drops its solids and impurities and also its condensed moisture. Preferably, I force the steam to make several changes of direction, with successive impingements. The staggered structures herein shown are practical to obtain that result. The flow of water removes the impurities and the condensed moisture which are received by the body of water in the drum. This water may be suitably withdrawn through any suitable ducts and, from time to time, the interior of the drum may be cleaned.

In a broad sense, as a preferred expression of my invention, I maintain a guided, backed flow of water against a surface or support in such fashion that the impingement of the steam against the flow of water will not scatter or disperse the water. The easiest method of imparting movement to the water is gravity, but I do not wish to limit myself to a gravital flow.

The shape of the surface or backing across which the water flows may be widely varied. It is immaterial whether I use a plurality of individual troughs or a larger, unitary trough structure. What is important is that I maintain a flow of water against the surface of which the steam may impinge without breaking up the water flow or dispersing it as mere spray.

I claim:

1. A steam purifying assembly for boilers, including a housing forming a purifying chamber and having therein a body of water with an exposed upper surface, one or more steam inlet ducts extending to said chamber above the level of said upper surface, one or more steam exit ducts therefrom and a purifying member in the path of flow of the steam through the housing above the surface of said water, and extending downwardly to a point of contact with said upper surface, said member including a plurality of guides each having a relatively extended surface facing toward the flow of the inflowing steam, and a supply member and a connection between it and the feed water of the boiler, said supply member being positioned adjacent the upper ends of the guides and being connected to said guides and being thereby adapted to supply a flow of feed water across said surfaces down to said body of water in position to receive the direct impingement of the flowing steam.

2. The structure of claim 1 characterized in that the guides are arranged in staggered relation in a plurality of rows, the guides of each row and the rows themselves being spaced apart to permit the passage of steam therebetween.

GUSTAV A. REHM.

REFERENCES CITED

The following references are of record in the file of this patent:

UNITED STATES PATENTS

| Number | Name | Date |
| --- | --- | --- |
| 1,044,208 | Luhn | Nov. 12, 1912 |
| 1,073,621 | Murray | Sept. 23, 1913 |
| 1,744,314 | Kirkpatrick | Jan. 14, 1930 |
| 1,989,773 | Snow | Feb. 5, 1935 |
| 2,287,592 | Andrews | June 23, 1942 |